United States Patent [19]
Lehr et al.

[11] 3,837,584
[45] Sept. 24, 1974

[54] APPARATUS FOR GRANULATING THERMOPLASTIC STRANDS

[75] Inventors: Heinz Lehr, Gelnhausen, Germany; Walter Swarat, Elmhurst, Ill.

[73] Assignee: Condux-Werk Herbert A. Merges KG, Wolfgang near Hanau, Germany

[22] Filed: Mar. 9, 1973

[21] Appl. No.: 339,947

[30] Foreign Application Priority Data
Mar. 15, 1972 Germany.............................. 2212345

[52] U.S. Cl................ 241/65, 241/186 R, 241/223, 241/280
[51] Int. Cl........................................... B02c 21/00
[58] Field of Search ......... 241/23, 46.11, 46.15, 65, 241/91, 92, 186 R, 223, 280, 281; 226/172

[56] References Cited
UNITED STATES PATENTS

| | | | |
|---|---|---|---|
| 2,282,708 | 5/1942 | Dantzig............................ | 241/65 X |
| 2,895,689 | 7/1959 | Edwards et al....................... | 241/23 |
| 2,957,508 | 10/1960 | Mason............................ | 241/223 X |
| 3,709,274 | 1/1973 | Marek et al..................... | 241/223 X |

*Primary Examiner*—Granville Y. Custer, Jr.
*Attorney, Agent, or Firm*—Spencer & Kaye

[57] ABSTRACT

In an apparatus for granulating thermoplastic strands there is provided a feeding device which, at its downstream end is interlocked with a comminuting device. The strands are advanced by cooperating conveyor belts along a supply path in the feeding device and are introduced into the comminuting device. In the feeding device and in the granulating device there is contained a liquid coolant which has a uniform liquid level and in which the cooperating portions of the conveyor belts are submerged to ensure that the strands are comminuted in a condition in which their outer surface is already hardened, while their interior is still soft.

7 Claims, 2 Drawing Figures

APPARATUS FOR GRANULATING THERMOPLASTIC STRANDS

BACKGROUND OF THE INVENTION

This invention relates to an apparatus for granulating thermoplastic strands and is of the type that has a feeding device including two endless, driven conveyor belts arranged side-by-side and forming a wedge-shaped inlet opening where the plastic strands to be granulated are pinched by the cooperating belts and forwarded thereby. Downstream of the conveyor belts there is disposed a rotary cutting cylinder which is supported horizontally in a housing and which cooperates with at least one stationary knife. The strands emerging from the feeding device are advanced in a parallel relationship to one another over the stationary knife and are brought into the operating range of the cutting cylinder.

A granulating apparatus of the afore-outlined type is disclosed, for example, in German Published application DAS No. 1916219. That apparatus, however, is adapted exclusively for the granulation of set, that is, cooled thermoplastic strands hardened over the entire cross section. Accordingly, the apparatus is provided, upstream of the cutting (granulating) device, or upstream of the feeding device, with a relatively long cooling station which appreciably contributes to the overall expenses of the apparatus. The granules obtained by this apparatus are of cylindrical shape; the cut surfaces, however, are uneven because during severance a partial breakage of the hardened strand is unavoidable. As a result, the granular mass contains undesirable fine particles; also the coarse cut surfaces adversely affect the further processing of the granules.

In addition to the afore-outlined cold granulating process a "hot comminuting process" has also been known. According to this method the pasty mass emerging from a nozzle is directly exposed to a liquid coolant and is severed in rapid succession in the immediate vicinity of the nozzle outlet. This operation is conventionally performed by means of a rotary knife which slides across the nozzle opening. The severed pasty pieces fall into a tank containing a liquid coolant. In this manner the severed pieces are prevented from adhering to one another.

In the "hot comminuting process" the cutting resistance is, since the material has not yet reached its form stability, substantially smaller than in the cold granulating process in which, in order to overcome the high cutting resistance, substantially more energy is needed. Consequently, in the cold granulating process high temperatures will appear at the cut faces which may result in thermal damage to the molecular structure. The shape of the granules obtained by the "hot comminuting process" is, however, not optimal for further processing.

SUMMARY OF THE INVENTION

It is among the objects of the invention to provide an improved apparatus for granulating thermoplastic strands which produces cylindrical granules of smooth cut faces without fine particles, which uses a minimum cutting energy for avoiding harmful thermal effects on the molecular structure in the cut zones, which ensures high productivity and which has only small spatial requirements.

These and other objects to become apparent as the specification progresses are accomplished according to the invention in which, briefly stated, the feeding device is at its downstream end, interlocked with a granulator and, downstream of the wedge-shaped inlet opening formed by the conveyor belts the latter extend parallel spaced to form a supply path. In the feeding device and in the granulator there is provided a liquid coolant, preferably water, of uniform liquid level, so that the conveyor belts that advance the strands are, together with the strands surrounded by the coolant at all sides.

According to a modification of the invention the coolant is maintained in a circulating flow which permits a reduction in the quantity of the momentarily active coolant.

In a granulating apparatus according to the invention the soft mass emerging from the nozzles is immediately introduced into the feeding device through an injector. Since the soft material is, immediately upon its exit from the nozzles, surrounded by the liquid coolant, its surface zones solidify relatively rapidly so that strands are formed which are of rigid surface but of soft interior. The strands are, in this condition, forwarded by the feeding device to the granulator in which they are comminuted. A further cooling of the granules is effected in the granulator subsequent to the cutting operation since the granulator housing too contains a liquid coolant.

The granulating apparatus according to the invention thus combines the advantages of the cold granulation (cylindrical form of the granules) with the advantages of the hot cutting process (small cutting resistance, smooth cut faces, no thermal damage of the molecular structure in the cut zone, a good subsequent workability and flow of the granules, no fine particles, no voluminous cooling stations) while the known disadvantages of both types of granulators are eliminated.

DESCRIPTION OF THE PREFERRED EMBODIMENTS

Figure 1:
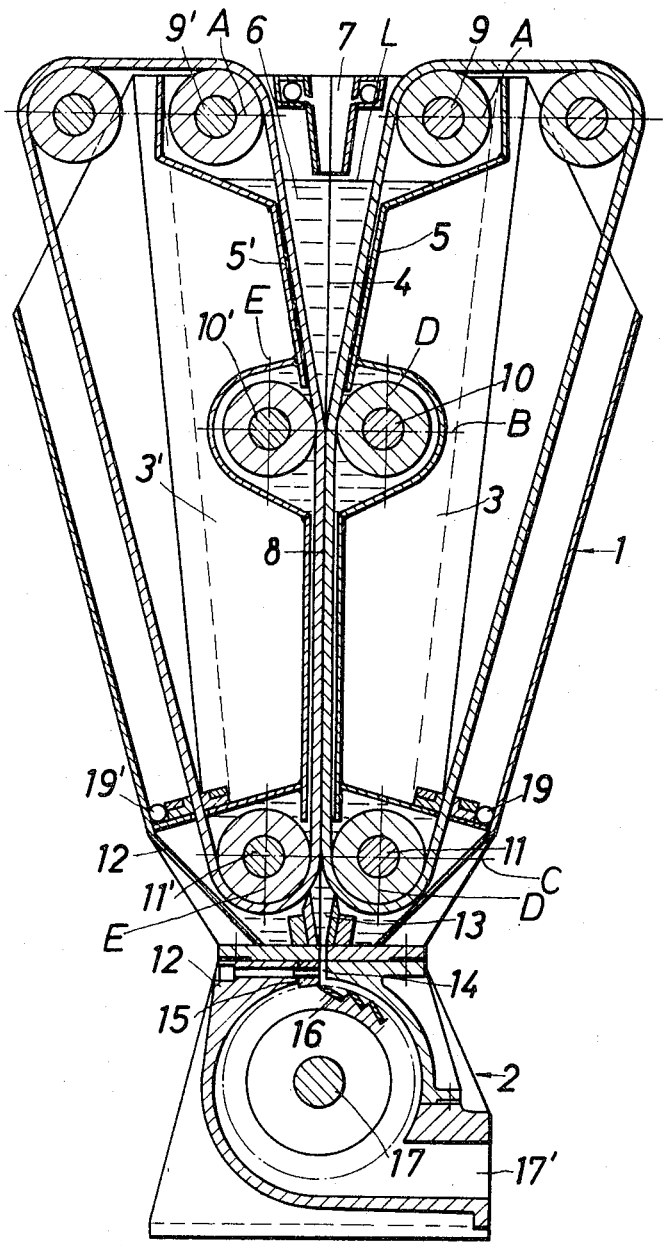
FIG. 1 is a schematic side elevational view of a preferred embodiment of the invention.

Turning first to FIG. 1, the granulating apparatus 12 for comminuting thermoplastic strands includes a feeding device 1 and a cutting device 2 mounted downstream of the feeding device in an interlocking relationship therewith. The feeding device 1 includes a housing formed of two identical parts 3 and 3' which are bolted to one another in a fluid tight manner along a separating line 4. As well seen in FIG. 1, each housing part 3 and 3' accommodates identical halves of the feeding device, the components of which will now be described in detail.

An injector 7 projects into a wedge-shaped inlet 6 formed of conveyor belts 5 and 5'. From the injector 7 there are emitted thermoplastic strands (not shown) which are fed between the two conveyor belts and then advanced thereby.

The wedge-shaped inlet 6 is joined by a supply path 8 along which the two conveyor belts 5 and 5' are arranged in a parallel spaced, face-to-face relationship. At least one of the conveyor belts 5 or 5' is driven, while the other is drivingly connected to the driven conveyor belt by the thermoplastic strands situated in the supply path 8.

In the work zone of the conveyor belts 5 and 5' there are disposed a first group of three conveyor rollers 9, 10 and 11 associated with the conveyor belt 5 and a second group of three conveyor rollers 9', 10' and 11' associated with the conveyor belt 5'. The rollers of the two groups are so arranged that, on the one hand, the axes of the three roller pairs 9, 9'; 10, 10' and 11, 11' lie in three spaced horizontal planes A, B, C, and, on the other hand, the axes of the two roller pairs 10, 11 and 10', 11' lie in two spaced vertical planes D and E.

In the end zone of the supply path 8 there is provided a wedge-shaped guiding space 13 which opens into the inlet channel 14 of the comminuting device 2. In the extension of the inlet channel 14 there is disposed an adjustable stationary knife 15 which cooperates in sequence with knives 16 mounted on the rotary knife cylinder 17.

Figure 2:
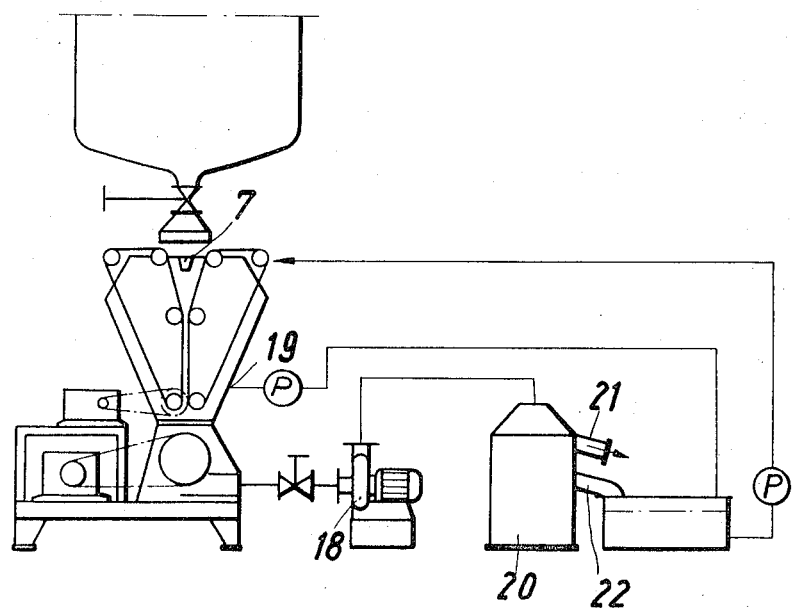
FIG. 2 is a schematic side elevational view of a system incorporating the preferred embodiment.

Turning now to FIG. 2, during operation liquid coolant is continuously introduced into the wedge-shaped inlet 6, so that a permanent liquid level L will reach approximately up to the outlet opening of the injector 7. Thus, the conveyor belts 5, 5' run at all times submerged in the liquid coolant along their work zone. This liquid coolant and the strands proceed together into the comminuting device 2. In this manner the knife cylinder 17 too operates at all times in the liquid coolant.

As further seen in FIG. 2, the granules and the coolant liquid are withdrawn together from the comminuting device 2 through the outlet 17' by means of a pump 18 with a flow rate identical to that with which the coolant is introduced into the feeding device 1.

The liquid accumulating in the feeding device due to the leakage may be withdrawn therefrom through openings 19 and 19'.

As shown in FIG. 2, the coolant and granule mixture is driven by the pump 18 into a centrifuge 20 which has outlets 21 and 22. Through the outlet 21 the granules are removed while through the outlet 22 the liquid coolant is discharged into a tank from which it is again admitted preferably subsequent to cooling, into the upstream end of the feeding device 1 in a circulating flow.

It will be understood that the above description of the present invention is susceptible to various modifications, changes and adaptations, and the same are intended to be comprehended within the meaning and range of equivalents of the appended claims.

We claim:

1. In an apparatus for granulating thermoplastic strands, said apparatus being of the type that has a feeding device including a pair of cooperating conveyor belts forming a wedge-shaped intake slot into which the strands are introduced, a cutting device disposed downstream of said feeding device and receiving the strands therefrom, said cutting device including a stationary knife and moving knives cooperating in sequence with the stationary knife for comminuting the strands into granules, the improvement comprising:
  a. a fluid tight housing means accommodating said feeding device and said cutting device;
  b. at least three first rollers mounted in said housing means for guiding one of the conveyor belts and at least three second rollers mounted in said housing means for guiding the other of the conveyor belts, each roller having a rotary axis; each said first roller being associated with one of said second rollers, whereby at least three roller pairs are formed; the axes of the rollers forming any one roller pair defining separate, superposed, spaced horizontal planes; the rotary axes of two of said first rollers in the two lowermost horizontal planes defining a first vertical plane; the rotary axes of two of said second rollers in the two lowermost horizontal planes defining a second vertical plane spaced from said first vertical plane; parallel extending, cooperating portions of said conveyor belts guided by the roller pairs associated with the two lowermost horizontal planes defining a supply path situated downstream of said intake slot; the zone of said supply path and the zone of said intake slot defining the work zone of said conveyor belts; and
  c. means for receiving a liquid coolant in said housing means; said liquid coolant having a uniform level and surrounding said conveyor belts at all sides in the work zone thereof.

2. An improvement as defined in claim 1, including a rotary cutting cylinder to which said movable knives are affixed; said cutting cylinder being surrounded by the coolant in said housing means.

3. An improvement as defined in claim 2, including means defining a guide channel leading from the downstream end of said feeding device into said cutting device, said coolant also surrounding said cutting device.

4. An improvement as defined in claim 3, including an outlet provided in said housing means and means for maintaining said coolant in circulation through said granulating apparatus.

5. An improvement as defined in claim 4, wherein said means for maintaining said coolant in circulation includes conduit means communicating with an upper portion of said feeding device and with said outlet and pump means communicating with said conduit means for withdrawing the coolant through said outlet and introducing the coolant into said upper portion of said feeding device.

6. An improvement as defined in claim 5, wherein said outlet serves to carry both said coolant and said granules mixed therewith.

7. An improvement as defined in claim 6, including separator means communicating with said conduit means for separating said granules from said coolant.

* * * * *